Figure 1:
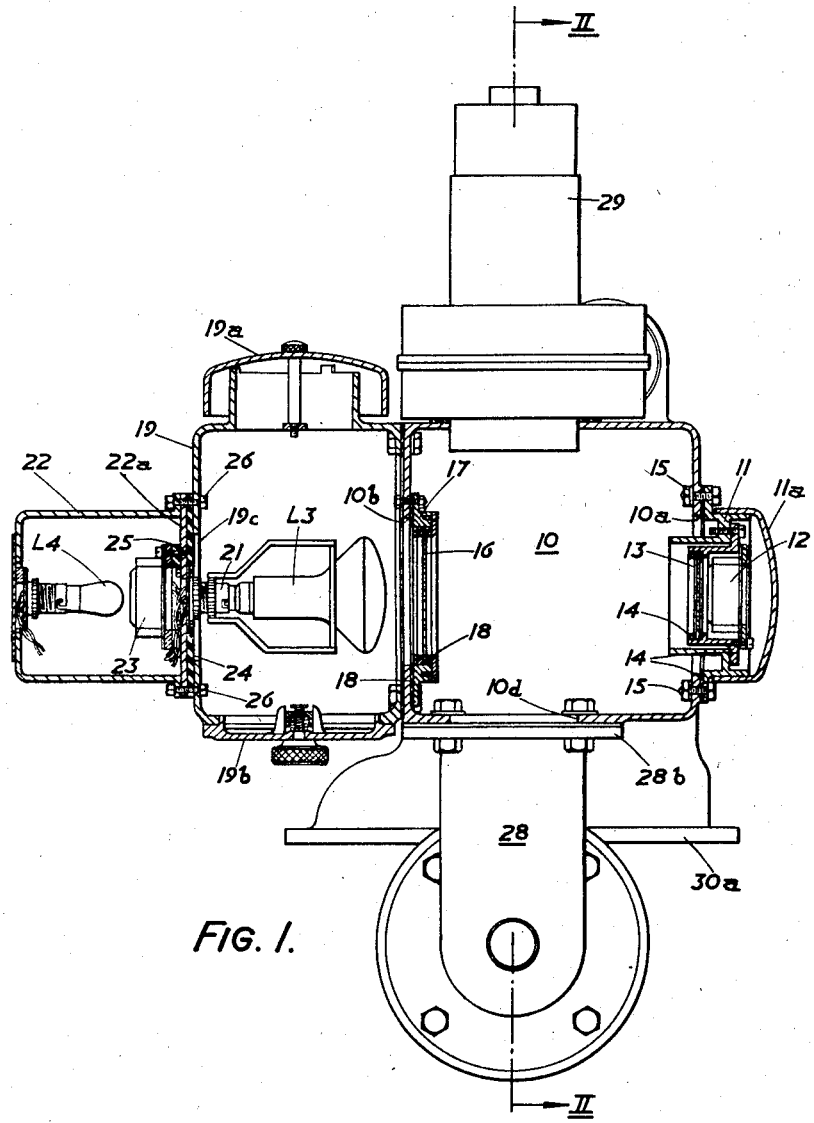

Oct. 6, 1959 A. MATHISEN 2,907,993
DETECTORS OF OIL MISTS AND THE LIKE
Filed Dec. 21, 1956 4 Sheets-Sheet 4
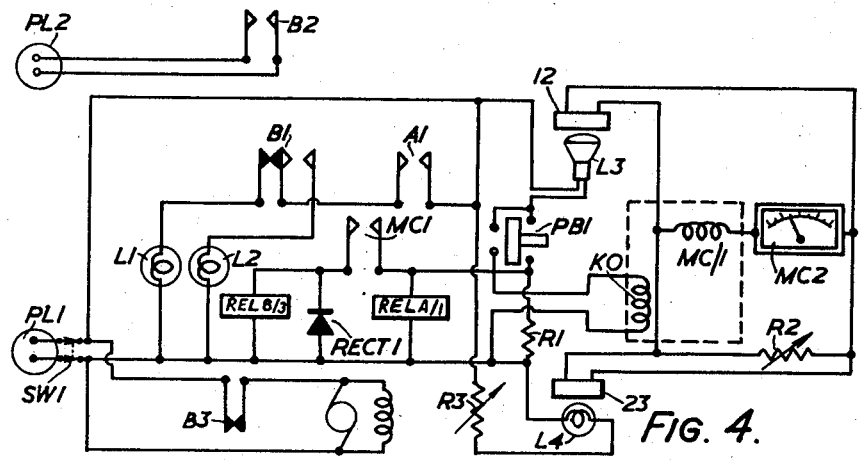
FIG. 4.
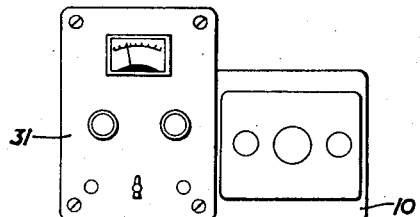
FIG. 5.
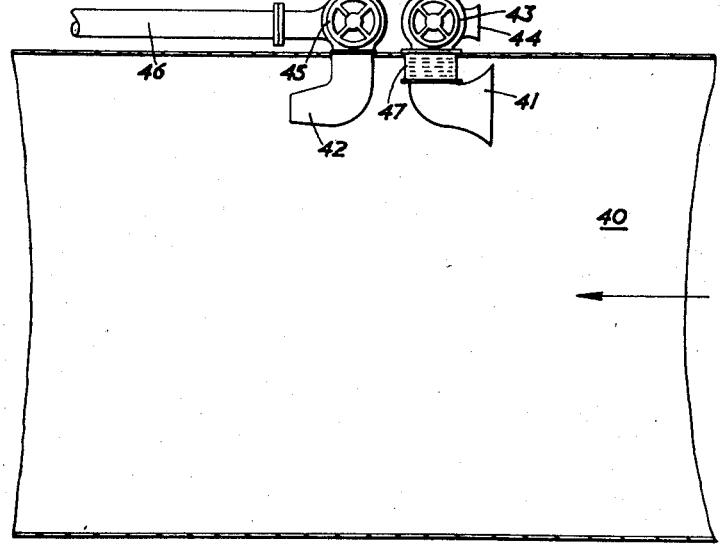
INVENTOR
Anders Mathisen
BY Mason and Mason
ATTORNEYS

United States Patent Office 2,907,993
Patented Oct. 6, 1959

2,907,993

DETECTORS OF OIL MISTS AND THE LIKE

Anders Mathisen, St. James's, London, England, assignor to Graviner Manufacturing Company Limited, London, England, a British company Application December 21, 1956, Serial No. 629,920

9 Claims. (Cl. 340—237)

This invention relates to detectors of oil mists and the like.

The invention is particularly concerned with detectors designed for the detection of lubricating oil mists of excessive concentration occurring during the running of rotating plant and machinery, and especially for the detection of such mists in the crankcases of internal combustion engines including diesel engines.

Excessive oil mist formation in crankcases, due for example to over-heated bearings or piston skirts, constitutes an explosion hazard, and it is therefore very desirable to provide detectors which will give an indication if excessive oil mist formation occurs, in order that remedial action may be taken to avoid risk of explosion.

It is to be understood that the invention is also applicable to the detection of mists in general, for example the detection of vapour mists in air conditioning, refrigerating and gas cooling systems.

According to the present invention, there is provided a detector for detecting the presence of oil mists and the like, comprising a hollow member, means for placing the interior of said hollow member in communication with the space in which the presence of such mists is to be detected, suction means for drawing gas which may carry such mists from said space through said means and into said interior, photoelectric means, a light source adapted to illuminate said photoelectric means, the illumination of the latter by said light source being varied by the presence of such mists in said interior, means for isolating said interior from said space, and means for enabling said interior to be placed in communication with a further space to enable mist-free gas to be drawn into said interior for checking correct operation of said detector.

The invention also provides a detector for detecting the presence of oil mists and the like by means of a light source and photoelectric means whose illumination by the light source is varied by the presence of oil mist and the like, the detector being located on the outside of the space in which such mist formation may occur and the interior of the detector being connected to a suction source whereby gas or vapour from the interior of the space to be monitored is drawn through the detector and across the path between the light source and the photoelectric means, the detector comprising means for isolating the interior of the detector from the interior of the space to be monitored and means for allowing clean air to be drawn into the interior of the detector when so isolated whereby correct operation of the detector may be checked.

In one construction a flap or other closure means is used to block an aperture connecting the interiors of the detector and the space to be monitored, the movement for so doing simultaneously uncovering the aperture through which clean air may be drawn.

In order to prevent the extracted gas or vapour contacting the envelopes of the light source or photoelectric means with the consequent danger of opaque deposits thereon, these may be positioned behind translucent screens, for example glass windows.

The detector may have a portion of its walls of transparent material to permit visual monitoring of the interior of the detector.

Figure 2:
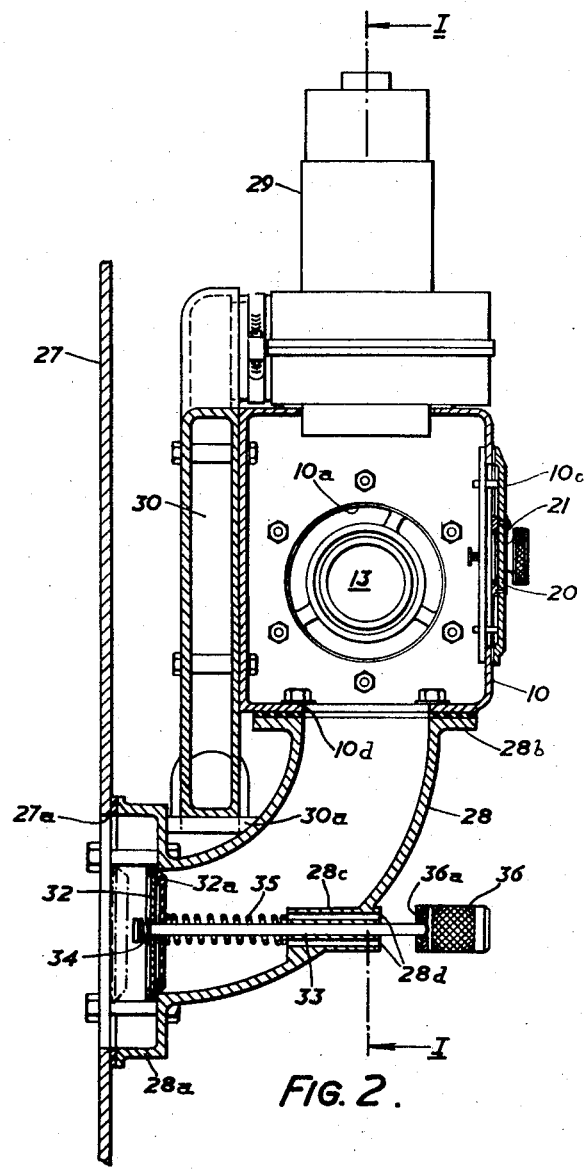
Figure 3:
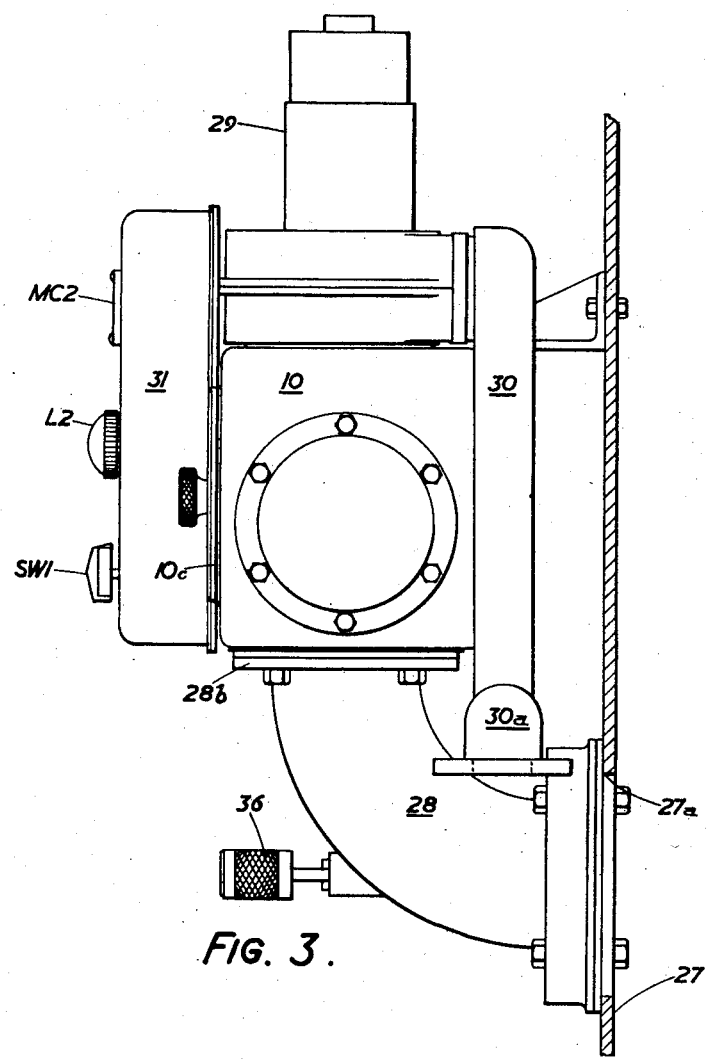

One construction of detector in accordance with the present invention and suitable for monitoring diesel engine crankcases, will now be described, by way of example only, reference being made to the accompanying drawings in which:

Figure 1 is a part-sectional front elevation of the detector taken along the line I—I in Figure 2, Figure 2 is a part-sectional side elevation taken along the line II—II in Figure 1, Figure 3 is an elevation of the opposite side to that shown in Figure 2, Figure 4 is a diagram of one form of circuit of the control and indicating unit used with the present detector, and Figure 5 is a diagrammatic side elevation showing a modified form of the detector fitted to a gas cooling system.

Referring now to the drawings, it will be seen that the detector comprises a hollow rectangular box 10 in the interior of which oil mist is detected. On one side of the box 10 a circular aperture 10a is formed in which a detachable housing 11 is fitted which contains a photoelectric cell 12 which will hereafter be referred to as the "measuring" cell. The cell 12 is mounted behind a glass window 13, and this window 13 and the various components of the housing are sealed by gaskets 14 at each junction surface to form a hermetic seal across the aperture 10a. The whole housing 11 can be removed by loosening nuts 15 and access can be obtained to the cell 12 by removing the outer cover 11a of the housing 11. A similar glass window 16, mounted in a holder 17, extends across a circular aperture 10b in the opposite side of the box 10 and is likewise hermetically sealed by gaskets 18.

An inspection cover 10c is provided on the front face of the box 10, and this can be removed to give access to the interior of the detection box 10 for cleaning the appropriate sides of the glass windows 13 and 16. This inspection cover 10c also contains a glass window 20 (Figure 2) normally covered by a pivotable flap 10e to permit visual inspection of the gases drawn through the interior of the detection box 10. A spot-light type lamp L3 is mounted in a holder 21 behind the window 16 in a lamp housing 19 mounted on the outside of the box 10. The housing 19 is provided with a ventilating cowl 19a for cooling of the lamp L3. A removable inspection cover 19b enables access to be obtained to the interior of the lamp housing 19 for servicing or cleaning of the lamp L3 or the appropriate side of the window 16. A recess 19c is provided in the side of the housing 19 opposite the window 16, and recess 19c is closed by the base 22a of a housing 22 which contains a photoelectric cell 23 similar to the measuring cell 12, this cell 23 being referred to hereafter as the "balancing" cell. The base 22a, which carries lamp holder 21, is separated from the adjacent wall of the housing 19 by a resilient cushion 24, a similar cushion 25 being provided between the base 22a and the base of the photocell 23. Mounted opposite the active surface of the balancing cell 23 is a small electric lamp L4. The balancing cell housing 22 and the lamp L3 can be removed by loosening of the nuts 26.

The detector is shown in this construction as mounted in position on a crankcase door 27 by means of an elbow pipe 28 which has a flanged mouth 28a at its lower end so that it can be secured across an opening 27a provided for this purpose in the crankcase door 27 whilst its upper end is provided with a flange 28b which is secured across an opening 10d in the base of the detection box 10.

An electrically driven fan 29 is mounted on the top of the detector box 10 with its suction side in communication with the interior of the box 10 and its exhaust in communication with a manifold 30 which terminates in two suction outlets 30a wihch can be connected by pipes (not shown) to openings in the crankcase which are remote from the opening 27a.

In operation, the fan 29 produces suction in the detection box 10 which causes gases and vapour to be drawn from the interior of the crankcase through the elbow pipe 28 into the box 10 from whence they are returned, via the fan 29, the exhaust manifold 30 and the return pipes, back to the crankcase. In their passage through the box 10 the gases and vapour traverse the beam of light projected from the lamp L3 onto the photocell 12. In this way, the gases and vapour in the crankcase can be sampled continuously and with sufficient circulation to ensure satisfactory monitoring due to the separation between the point at which the gases and vapour are removed and the points at which they are returned.

In order to check correct functioning of the detector it is necessary to isolate the interior of the box 10 from the crankcase, for reasons which will be explained hereafter. In the construction being described this is achieved by mounting a disc closure member 32 in the flanged mouth 28a of the elbow pipe 28 so that it can be moved axially from its normal position shown in broken lines to the position shown in Figure 2. In this position a facing of resilient sealing material 32a seals the mouth of the pipe 28. The disc 32 is mounted on a rod 33, between springs 34 and 35, the rod 33 being slidable in a bush 28c formed in the elbow pipe 28. A knob 36, used to pull the rod 33 to move the disc 32 to its closed position against pressure of the springs 34 and 35, normally closes two ports 28d in the bush 28c. Thus, when disc 32 is held in the closed position the ports 28d are open and clean air can be drawn from the engine room into the interior of the elbow pipe 28 and thus into the detection box 10. The inner face of the finger knob 36 is provided with a facing 36a of resilient sealing material so that in the normal position of the closure member 32 the ports 28d in the bush 28c are sealed from the engine room.

An indicating, control and monitoring unit 31 (Figure 3) is used with the detector for the purpose of giving an alarm when obscuration of the light from lamp L3 falling on the photocell 12 reaches a predetermined level corresponding to a predetermined oil mist concentration. The unit 31 is also for monitoring the correct operation of the detector.

As shown in Figure 4, connection of the unit 31 to a power supply is made by means of a plug PL1 and the supply can be interrupted by a double-pole single-throw switch SW1. This supply feeds the spotlight lamp L3 in series with a resistor R1 and a push button reset switch PB1. The resistor R1 serves to reduce the voltage across the lamp L3, hence increasing its life, and provides a low voltage supply for relays A/1 and B/3. The balancing cell lamp L4 is also fed from the power supply, in series with adjustable resistor R3. The electrical outputs of the photocells 12 and 23 are fed in opposition to a moving coil relay MC/1 and a moving coil microammeter MC2 in series. An adjustable resistor R2 shunts the photocells to provide for sensitivity adjustment, whilst the resistor R3 is adjustable for setting the zero of the microammeter MC2. One reason for the use of a balancing cell is to reduce variations in the current through the ammeter MC2 which would otherwise occur as a result of temperature changes effecting the sensitivity of the cell and voltage variations causing changes in the light output from lamp L3. A Normal green indicator lamp L1 is supplied via the normally-closed side of changeover contacts B1 and contacts A1, relay A/1 normally being energised from the voltage across resistor R1.

The resistor R3 is adjusted so that under normal conditions there will be no current through MC/1 and MC2, but should the measuring cell 12 become obscured its output will decrease and the current through MC/1 and MC2 will increase accordingly. This increased current is indicated on the microammeter MC2, which may be calibrated in oil mist density, and in the event of the obscuration of the cell 12 reaching a predetermined level the resultant out-of-balance current through relay MC/1 will be such that the contacts MC1 will be closed thus energising relay B/3. This will cause contacts B1 to change over to their normally open side and light a red Warning lamp L2, via contacts A1 and B1, lamp L1 being extinguished. An audible alarm (not shown) may be connected to plug PL2 so that it is sounded by closure of contacts B2. The fan motor is cut-off by opening of normally-closed contacts B3. If desired, further contacts may be provided for completing an operating circuit for one or more automatically operated fire extinguishers, such as $CO_2$ extinguishers, designed to discharge into the crankcase. In the event of a failure of the spotlight lamp L3, no voltage will be available for relay A/1 which will, therefore, be de-energised. A visual indication is given of this condition because, although the unit is switched on, neither lamps L1 nor L2 will be alight, their supply being broken by contacts A1. A green glass is provided to receive a portion of the light from lamp L4 so that failure of this lamp can also be spotted. The rectifier RECT1 is provided across relay coil B/3 to prevent arcing at contacts MC1. The relay MC/1 is of a type in which the contacts MC1 are held closed after initial closure, so that intermittent operation is avoided. To reset the apparatus it is necessary to depress the reset switch PB1 and brings a "kick-off" coil KO into circuit which opens the contacts MC1 and restores the unit to its normal condition.

Cleaning of the windows 13 and 16 will be performed at regular intervals and it is likewise necessary to make regular checks of the zero setting of meter MC2 when the windows are clean, in case there has been any deterioration in the lamps L3 and L4 and/or the photoelectric cells 12 and 23. To check the zero setting of the meter MC2 it is clearly necessary to exclude any gas or vapour from the interior of the box 10 which would effect the zero reading and this is achieved by isolating the interior of the box 10 from the crankcase and connecting the former to a source of clean air as indicated above. It will be understood that the choice of photoelectric cells to be used will depend upon the conditions to be met with, particular regard being paid to the maximum ambient temperature and vibration to which the cells will be exposed. It is believed that a particularly suitable device for this purpose is a photo-conductive crystal, for example of cadmium sulphide. However, at the present time such crystals are not readily available and at least until such time as they are available other known forms of photoelectric devices which will meet the requirements may be used, such as barrier layer cells and photo-emissive and photo-conductive cells.

In one construction of detector made in the above form the spotlight lamp L3 was a 75 watt 220 volt lamp, the balancing lamp L4 was a 15 watt 220 volt lamp and the photocells were selenium barrier layer cells, having an active surface 45 millimetres in diameter. Whilst movement of the closure member 32 may be effected manually, it is also possible to effect the movement from a remote position particularly when the indicating and control unit 31 is located remote from the detector instead of being mounted on it as shown in Figure 3. This may be achieved, for example, by using a solenoid to effect movement of the closure member the springs being used to effect the return of the member 32 to its normal position when the solenoid is de-energised. It will be understood that because the crankcase is isolated from the interior of the detector during cleaning, there will only be clean air present which is drawn through the detector from the engine-room so that there will be no mist present when recalibration is effected.

The method of checking referred to requires the existence of an indicating instrument. However, the detector could be used without any indicating instrument but only with an alarm, and in such a case an obscuration disc may be used which is inserted in the path between the lamp L4 and the photocell 12. The degree of obscuration of the disc is such that with the windows clean and the lamp L4 and cell 12 giving full output, the output will just be sufficient to prevent operation of the alarm. This means that if an alarm is given deterioration has occurred and the rheostat or other adjusting means in the control unit is reset until the alarm just fails to operate. Preferably the adjusting means will be calibrated so that it can then be further adjusted to give a predetermined margin of safety from the operating level.

Referring to Figure 5 this shows the application of the invention to the detection of excessive oil mist formation in a duct 40 carrying cooling gases, the presence of oil mist being due to vaporised lubricant.

A detector generally similar to that already described is mounted on the wall of the duct 40, but in this case no suction fan is required as the coolant flow is sufficient to force some of the gas through a pick-up funnel 41 which faces upstream, the gas return from the detector being through a venturi nozzle 42 facing downstream. The inlet to the detector is provided with a valve 43 to cut-off the pick-up funnel 41 and allow clean air from outside the duct 40 to be drawn into the detector through a normally closed orifice 44, the return duct having a similar valve 45 to enable the outlet from the detector to be connected to a suction pipe 46 which provides the suction for drawing in the cool air. In some circumstances the temperature of the gas in the duct may be as high as 200° C. to 300° C., and in this case cooling of the gas entering the detector may be effected by a small liquid-cooled condenser or cooling unit 47 in order to ensure that the oil mist condenses so that maximum obscuration effect is obtained. Where high temperatures are involved it may be desirable to mount the control and indicating unit 31 remote from the remainder of the detector and to air or water cool the casing in order to limit the maximum temperature to which the photoelectric cell and light sources are submitted.

What I claim is:

1. In a detector for detecting the presence of oil mists and the like, a housing having a first gas inlet adapted to be connected to the potential source of oil mists, a second gas inlet through which clean air can be drawn, and a single gas outlet, gas suction-producing means communicating with said gas outlet, selectively operable closure means movable between a first position in which it closes said first gas inlet and opens said second gas inlet and a second position in which it opens said first gas inlet and closes said second gas inlet, resilient means adapted to normally maintain said closure means in the second position, a photo-electric cell mounted on said housing and an electric lamp also mounted on said housing.

2. In a detector for detecting the formation of oil mists, a hollow housing, said housing having a first inlet through which gas can pass into the interior of said housing and a second inlet through which gas can pass into the interior of said housing, a manually movable member having mounted thereon a first closure member for closing said first inlet and a second closure member for closing said second inlet, said manually movable member being movable between a first position in which said first closure member closes said first inlet and said second inlet is open and a second position in which said second closure member closes said second inlet and said first inlet is open, resilient means for urging said manually movable member into said first position, an electric lamp adapted to project light across the interior of said housing, and a photo-electric cell adapted to be illuminated by light projected across the interior of said housing.

3. In a detector for detecting the formation of oil mists, a hollow housing, said housing having a first inlet through which gas can pass into the interior of said housing and a second inlet through which gas can pass into the interior of said housing, a manually movable member having mounted thereon a first closure member for closing said first inlet and a second closure member for closing said second inlet, said manually movable member being movable between a first position in which said first closure member closes said first inlet and said second inlet is open and a second position in which said second closure member closes said second inlet and said first inlet is open, resilient means for using said manually movable member into said first position, a first electric lamp, a second electric lamp, a first photo-electric cell, a second photo-electric cell, said first electric lamp being adapted to project light across the interior of said housing onto said first photo-electric cell, said second electric lamp being adapted to project light onto said second photo-electric cell, means for excluding from the interior of said housing light from said second electric lamp, a moving coil electrical relay, said first and second photo-electric cells being electrically connected to said moving coil relay with opposite polarity whereby the electrical outputs of the cells applied to said moving coil relay oppose one another, said relay having a pair of electrical contacts which are closed when said relay is energised by a predetermined resultant output from said photoelectric cells, a further electrical relay, a source of electricity, said further relay being electrically connected in circuit with said pair of contacts and said source of electricity whereby said further relay is energised when said pair of contacts are closed, said further relay having a further pair of electrical contacts which are closed when said further relay is energised, and an electrically operated warning device, said warning device being connected in an electrical circuit with said source of electricity and said further pair of contacts whereby said warning device is operated when said further pair of contacts are closed.

4. In a detector for detecting the formation of oil mists, a hollow housing, said housing having a first inlet through which gas can pass into the interior of said housing and a second inlet through which gas can pass into the interior of said housing, a manually movable member having mounted thereon a first closure member for closing said first inlet and a second closure member for closing said second inlet, said manually movable member being movable between a first position in which said first closure member closes said first inlet and said second inlet is open and a second position in which said second closure member closes said second inlet and said first inlet is open, resilient means for urging said manually movable member into said first position, a first electric lamp, a second electric lamp, a first photo-electric cell, a second photo-electric cell, said first electric lamp being adapted to project light across the interior of said housing, onto said first photo-electric cell, said second electric lamp being adapted to project light onto said second photo-electric cell, means for excluding from the interior of said housing light from said second electric lamp, an electrical alarm, a circuit for combining the electrical outputs from said first and second photo-electric cells, and means adapted to utilize the resultant electrical output to control the operation of said electrical alarm.

5. In a detector for detecting the presence of oil mists and the like, a hollow housing, said housing having an opening therein, a tubular member, said tubular member having side walls and being open at each end, one end of said tubular member being connected to said housing with the interior of said tubular member in communication through said opening with the interior of said housing, suction producing means having a suction inlet and an exhaust outlet, the suction inlet being in communication with the interior of said housing, a light source adapted to project light across the interior of said housing, photo-electric means, said photo-electric means being illuminated by light projected across the interior of said housing, said tubular member having an air inlet in its side walls, a rod, said rod passing through said side walls adjacent said air inlet, said rod having mounted thereon at one end means for blocking the end of said tubular member remote from said housing, resilient means adapted to urge said rod to a position at which the last-mentioned end of said tubular member is not blocked, a knob on said rod for effecting manual movement thereof, said knob closing said air inlet when said rod is in the aforesaid position.

6. In a detector for detecting the presence of oil mists and the like, a housing having a first gas inlet, a second gas inlet and a single gas outlet, gas suction-producing means communicating with said gas outlet, a manually movable member having mounted thereon a first closure member for closing said first inlet and a second closure member for closing said second inlet, said manually movable member being movable between a first position in which said first closure member closes said first inlet and said second inlet is open and a second position in which said second closure member closes said second inlet and said first inlet is open, resilient means for urging said manually movable member into said first position, a photo-electric cell mounted on said housing, an electric lamp also mounted on said housing, an electrical relay, said relay being electrically connected to said photo-electric cell, a pair of electrical contacts, said contacts being closed when said relay is energised, an electrically operated warning device, and a source of electricity for operating said warning device, said warning device and said source of electricity being connected with said pair of contacts in an electrical circuit which is completed when said contacts are closed.

7. In a detector for detecting the presence of oil mists and the like in the interior of the crankcase of an internal combustion engine, a housing having a first gas inlet adapted to be connected to the interior of said crankcase, a second gas inlet opening to atmosphere and a single gas outlet adapted to be connected to said crankcase interior at a position remote from that at which said first gas inlet is connected, gas suction-producing means communicating with said gas outlet, a manually movable member having mounted thereon a first closure member for closing said first inlet and a second closure member for closing said second inlet, said manually movable member being movable between a first position in which said first closure member closes said first inlet and said second inlet is open and a second position in which said second closure member closes said second inlet and said first inlet is open, resilient means for urging said manually movable member into said first position, a photo-electric cell mounted on said housing, and an electric lamp mounted on said housing.

8. In a detector for detecting the formation of oil mists, a hollow housing, said housing having a first inlet through which gas can pass into the interior of said housing and a second inlet through which gas can pass into the interior of said housing, a gas outlet, gas suction-producing means communicating with said gas outlet, a first closure member for closing said first inlet, a second closure member for closing said second inlet, closure member control means for selectively and simultaneously moving said first closure member to a position at which it closes said first inlet whilst moving said second closure member to a position at which it opens said second inlet, means for urging said closure member control means into a position in which said first inlet is open and said second inlet is closed, a first electric lamp, a second electric lamp, a first photo-electric cell, a second photo-electric cell, said first electric lamp being adapted to project light across the interior of said housing onto said first photo-electric cell, said second electric lamp being adapted to project light onto said second photo-electric cell, means for excluding from the interior of said housing light from said second electric lamp, an electrical alarm, a circuit for combining the electrical outputs from said first and second photo-electric cells, means adapted to utilize the resultant electrical output to control the operation of said electrical alarm, means for connecting said first inlet to the interior of the crankcase of an internal combustion engine, and means for connecting said gas outlet to said crankcase interior at a position remote from that at which said first inlet is connected.

9. In a detector for detecting the presence of oil mists and the like, a hollow housing, said housing having an opening therein, a tubular member, said tubular member having side walls and being open at each end, one end of said tubular member being connected to said housing with the interior of said tubular member in communication through said opening with the interior of said housing, suction producing means having a suction inlet and an exhaust outlet, the suction inlet being in communication with the interior of said housing, a light source adapted to project light across the interior of said housing, photo-electric means, said photo-electric means being illuminated by light projected across the interior of said housing, said tubular member being of elbow shape and having at the end thereof remote from the housing a closure disc normal to the axis of the tubular member at said end and movable to open and close said end, a rod, said rod extending normal to said closure disc, a bush formed in the wall of the tubular member defining a passage through which said rod extends, at least one additional passage in said bush through which additional passage air may enter the tubular member from outside thereof, a knob on said rod externally of said tubular member for effecting manual movement of the rod along its length, the assembly of said knob, rod and disc being movable between a first position in which said disc opens said end of the tubular member and said knob closes said additional passage in said bush, and a second position in which said disc closes said end of the tubular member and said knob opens said additional passage in said bush, and a spring adapted to urge said assembly into the first position.

References Cited in the file of this patent

UNITED STATES PATENTS

| | | |
|---|---|---|
| 1,969,626 | Simon et al. | Aug. 7, 1934 |
| 2,278,920 | Evans et al. | Apr. 7, 1942 |
| 2,301,367 | Cahusac et al. | Nov. 10, 1942 |